(No Model.)
A. W. DUFFY.
CHURN.
No. 415,624. Patented Nov. 19, 1889.
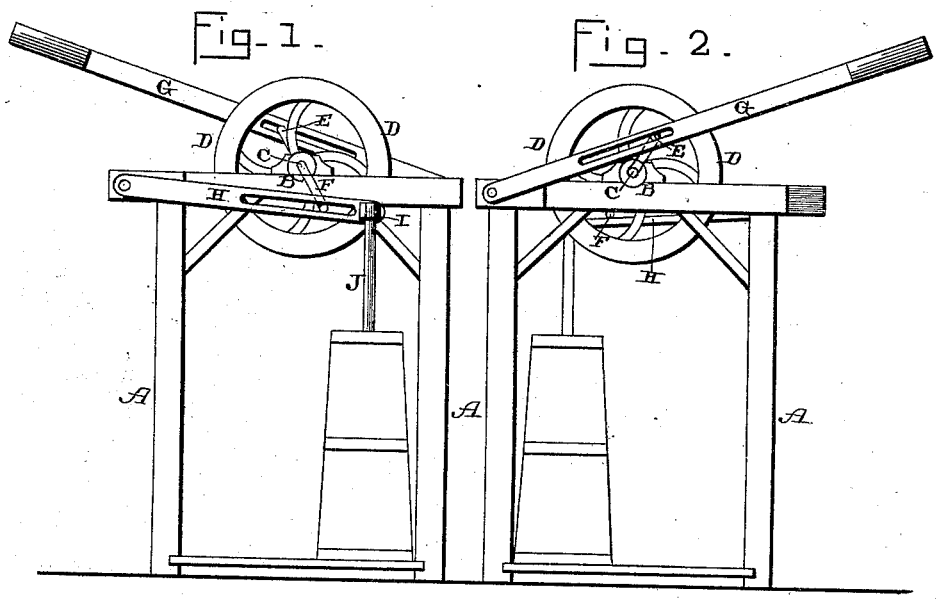
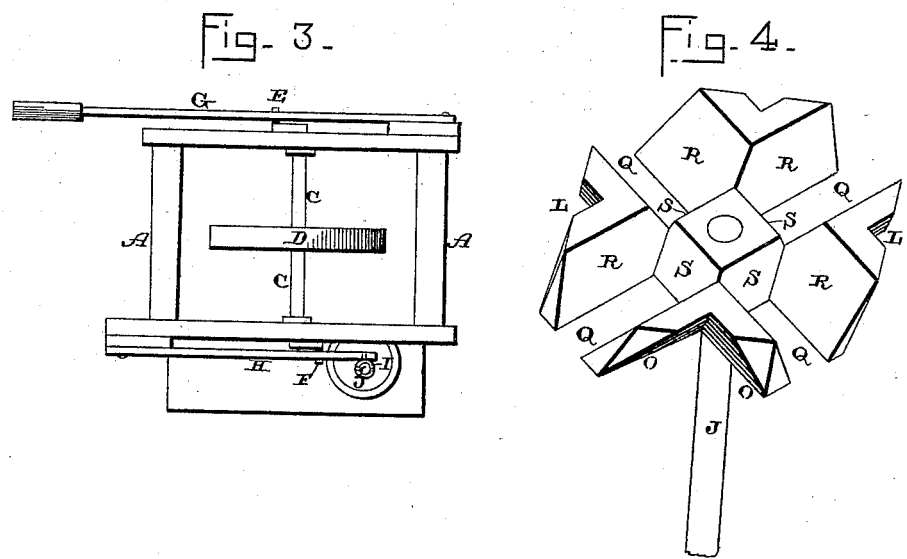
Witnesses:
E. P. Ellis
L. L. Burket
Inventor:
Allen W. Duffy
per
F. W. Lehmann,
Atty.

UNITED STATES PATENT OFFICE.

ALLEN W. DUFFY, OF BENTONVILLE, ARKANSAS.

CHURN.

SPECIFICATION forming part of Letters Patent No. 415,624, dated November 19, 1889.

Application filed April 2, 1889. Serial No. 305,700. (No model.)

*To all whom it may concern:*

Be it known that I, ALLEN W. DUFFY, of Bentonville, in the county of Benton and State of Arkansas, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in churns.

The object of my invention is to provide a motor for churns by which the dasher can be given a rapid and even movement, and to so construct the dasher that the cream is forced outward both upon the up and down strokes.

Figures 1 and 2 are side elevations of a churn which embodies my invention. Fig. 3 is a plan view of the same. Fig. 4 is a perspective of the dasher alone.

A represents a suitable frame-work of any desired construction, upon the top of which is journaled, in suitable boxes B, the shaft C, which is provided with a balance-wheel D. Upon each end of this shaft C is formed a crank E F, and pivoted to the frame, upon the same side as the crank E, is a slotted lever G, through which the crank passes. This lever may be given any desired length, and by means of which the shaft C is made to rapidly revolve. Should it be so desired, the shaft may be pivoted above the top of the frame and be operated by the foot instead of by hand.

To the same side of the frame as the crank F is pivoted a slotted lever H, through which the crank F passes, and fastened to the outer free end of this lever is a plate to which a thimble I is pivoted. The dasher-rod J, passing through this thimble, is fastened thereto by means of a set-screw, and the thimble always keeps the rod in a vertical position. The dasher L, secured to the lower end of the dasher-rod, has four pairs of wings radiating from its center, and each pair of wings are so shaped and so placed in relation to each other as to form a V and the upper surfaces O, which incline downward and outward, as shown. By so placing and shaping the wings the cream flows downward and is forced outward against the inside of the churn in proportion to the rapidity with which the dasher is raised. The extreme outer corner of each of the wings is cut away, as shown, so as to make the dasher conform more closely to the shape of the body of the churn. Each pair of wings is separated a suitable distance from each other by a space Q, and the under side of each of the wings is cut or beveled away, forming the surfaces R, so that as the dasher is depressed the cream will be forced both downward and outward against the sides of the churn. Any inward movement of the cream as the dasher descends is checked by the sides S of the body or central portion of the dasher. This dasher being provided with inclined surfaces both upon its top and its bottom, the cream is forced outward by its own gravity as the dasher is raised, and as the dasher descends the whole force of the descent is utilized in forcing the cream outward against the sides of the body. This constant outward motion of the cream against the side of the churn tends to break the butter-globules very rapidly.

Having thus described my invention, I claim—

1. The combination of the frame, the shaft journaled thereon and provided with a balance-wheel at its center and a crank at each end, the pivoted slotted lever for operating the shaft, and the pivoted slotted lever for operating the churn-dasher, the thimble connected to this lever, and the churn-dasher, the rod of which passes through the thimble, substantially as shown and described.

2. A churn-dasher consisting of a central body having directly attached thereto a series of pairs of wings, the wings of each pair being joined together at their inner ends at an angle to each other and joined to the central body at an angle with a perpendicular line which is parallel to the dasher-shaft, whereby the inclined surfaces O and R are formed.

In testimony whereof I affix my signature in presence of two witnesses.

ALLEN W. DUFFY.

Witnesses:
D. W. PEEL,
G. M. CRAIG.